(12) United States Patent
Yushiya (10) Patent No.: US 6,320,681 B1
(45) Date of Patent: *Nov. 20, 2001

(54) IMAGE READING APPARATUS (75) Inventor: Akihiko Yushiya, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,844

(22) Filed: Jan. 16, 1997

(30) Foreign Application Priority Data

Jan. 19, 1996 (JP) .................................... 8-007484

(51) Int. Cl.⁷ .................... H04N 1/46; H04N 1/04
(52) U.S. Cl. ................ 358/509; 358/505; 358/475; 358/513
(58) Field of Search ..................... 358/510, 509, 358/511, 512, 484, 475, 515; 362/800, 32, 231, 249; 250/205, 578.1, 208.1

(56) References Cited

U.S. PATENT DOCUMENTS 4,639,608 * 1/1987 Kuroda ............................. 250/578
5,019,897 * 5/1991 Shirata et al. ...................... 358/75
5,063,462 * 11/1991 Nakagawa et al. ................. 358/475
5,499,112 * 3/1996 Kawai et al. ....................... 358/475
5,587,814 * 12/1996 Mihara et al. ..................... 358/512
5,612,811 * 3/1997 Aikawa et al. .................... 358/509
5,808,295 * 9/1998 Takeda et al. ..................... 250/216
5,818,033 * 10/1998 Takeda et al. ................... 250/208.1
5,898,510 * 4/1999 Kaihotsu et al. ................... 358/509

FOREIGN PATENT DOCUMENTS 0607930   7/1994 (EP) .
0663756   7/1995 (EP) .

\* cited by examiner

Primary Examiner—Joseph Mancuso
Assistant Examiner—Hien Truong
(74) Attorney, Agent, or Firm—Fitzpatrick, Cella, Harper & Scinto

(57) ABSTRACT

There is disclosed an image reading apparatus having a plurality of illuminating packages and an optical guide member for guiding lights from the plurality of illuminating packages and reflecting in the direction of an object, thereby irradiating the object in a line shape, wherein three or more illuminating packages are arranged at positions in the optical guide member which are symmetrical for a reflecting portion of the optical guide member and an image can be read at a high picture quality.

84 Claims, 11 Drawing Sheets

IMAGE READING APPARATUS

BACKGROUND OF THE INVENTION

1. Field of the Invention

The invention relates to an image reading apparatus for reading an original image in an image scanner, a facsimile apparatus, or the like. More particularly, the invention is suitable for use in an image reading apparatus with a construction such that an original is irradiated by an irradiation light of an LED (light emitting diode) and an image of the original is photographed by a CCD (charge coupled device) one-dimensional image sensor.

2. Related Background Art

As a conventional color image reading apparatus, there is known a color image sensor of a light source switching type such that LEDs having light emitting characteristics of three colors of R, G, and B are used and signals are extracted from image sensors each time the same position of an original is irradiated by lights of R, G, and B, thereby obtaining a color signal corresponding to the original.

Figure 17:
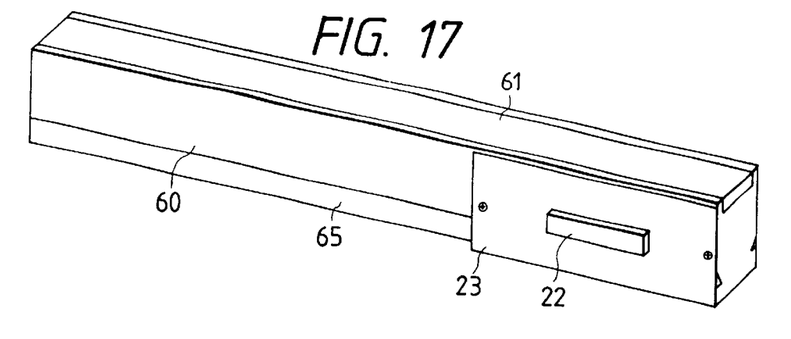
FIG. 17 is an external view of a reading unit in a conventional image reading system.
Figure 18:
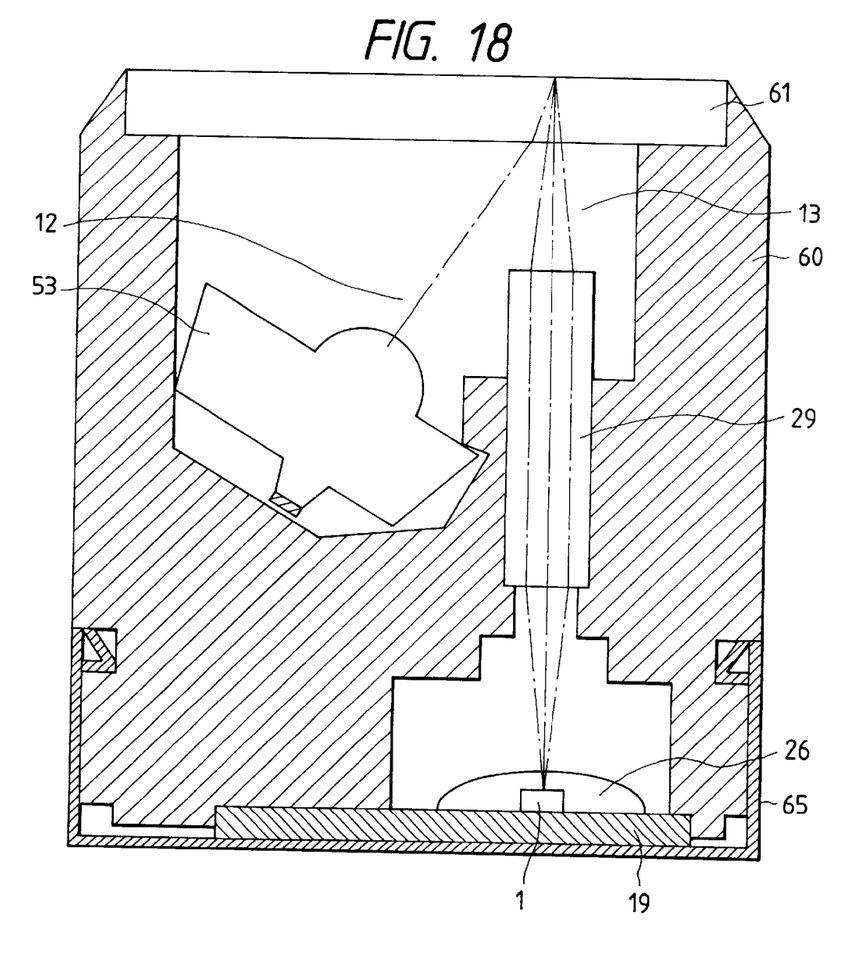
FIG. 18 is a cross sectional view of the reading unit in a conventional image reading system.
Figure 19:
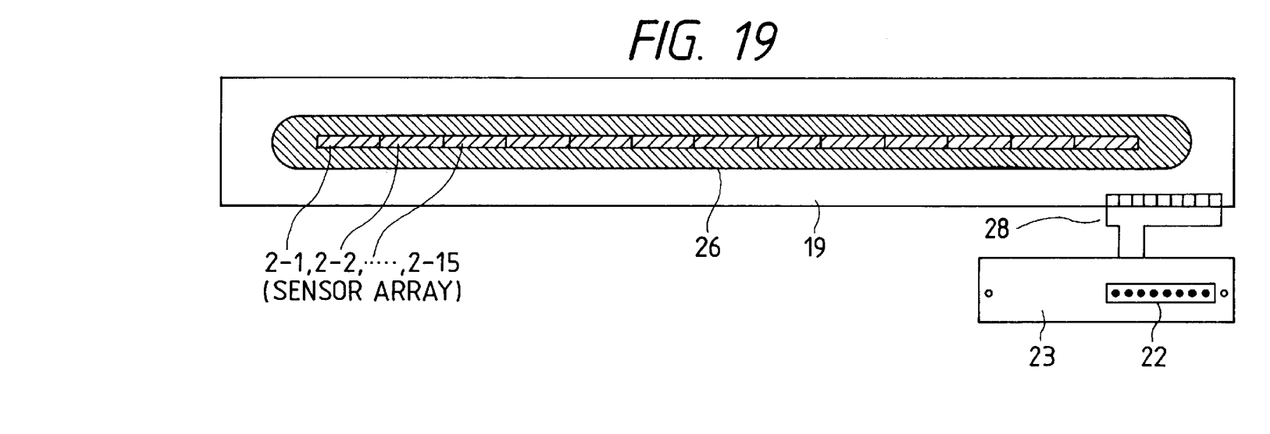
FIG. 19 is a top view of a sensor array board of the reading unit in the conventional system.

FIGS. 17 to 19 show an example of such a color image sensor of the light source switching type. The color image sensor is constructed by: a light source 53 for allowing LED lights of three colors of R, G, and B to enter from an edge surface of an optical guide member and irradiating the uniform light from a side surface to an original; an image pickup device array 29 of a short focal point; and a sensor array 1 in which a plurality of line sensors are arranged in a line.

A main portion of the color image sensor as mentioned above has a construction such that a transparent glass plate 61 which is in contact with the original surface is attached to an upper surface of a frame 60, an emission light 12 of the optical guide light source 53 provided in the frame 60 is reflected by the original surface which is in contact with an upper surface of the transparent glass plate 61, and a reflection light 13 enters the sensor array 1 provided on a board 19 through the optical system 29 in correspondence to the optical system 29. As an optical system, a short focal point image pickup device array represented by, for example, a trade name "SELFOC lens array" (made by Nippon Sheet Glass Co., Ltd.) is used.

As shown in FIG. 19, the sensor array 1 serving as photoelectric converting means is a multichip type line sensor in which a plurality of line sensors 2-1, 2-2, . . . , and 2-15 are arranged in a line on the board 19. The whole sensor array 1 is covered by a protecting film 26. Like a SELFOC lens array as mentioned above, when the reflection light from the original is formed as an image onto the sensor array 1 at an equal magnification and the image is read out, a length of sensor array 1 corresponding to only a width of original to be read is needed. Therefore, the length of sensor array 1 which is necessary changes in dependence on a size of original to be read. The number of line sensors constructing the sensor array 1 also changes.

For example, in case of the sensor unit which can read an original of the A3 size, now assuming that a length of one line sensor is equal to 20 mm, it is sufficient to construct the sensor array of 15 line sensors. The board 19 on which such a sensor array 1 is installed is supported onto a bottom plate 65 which is in engagement with the frame 60. The board 19 is connected to a flexible board 23 through a flexible wiring 28. A connector 22 for inputting/outputting a power source, a control signal, and the like is provided on the flexible board 23. The flexible board 23 is attached to the frame 60.

Figure 20:
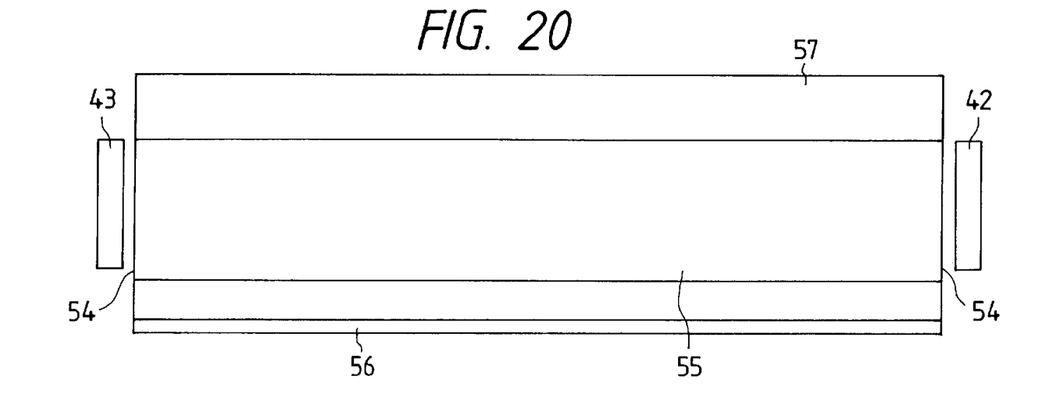
FIG. 20 is a diagram showing a positional relation between LED boards and an optical guide light source in the conventional system.

FIG. 20 shows a shape in the longitudinal direction of the image sensor of the optical guide light source 53 and a positional relation between the optical guide and LED boards 42 and 43. The LED boards 42 and 43 are attached to incident surfaces 54 at both edges.

Figure 21:
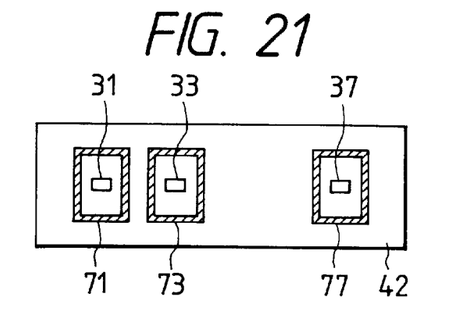
FIG. 21 is an arrangement diagram of LEDs of a conventional LED package.
Figure 22:
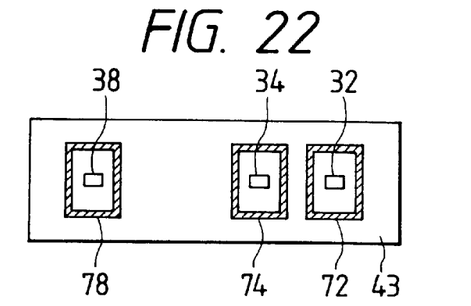
FIG. 22 is an arrangement diagram of LEDs of a conventional LED package.

FIGS. 21 and 22 show an arrangement of LED packages 71 to 74, 77 and 78 on the LED boards 42 and 43 and an arrangement of LED chips 31 to 34, 37, and 38 in LED packages 71 to 74, 77, and 78. One LED chip is enclosed in one LED package. One LED chip is included in each LED board every light emitting color of R, G, and B. There are the LED chips 31 and 32 each having a light emitting color of R, the LED chips 33 and 34 each having a light emitting color of G, and the LED chips 37 and 38 each having a light emitting color of B. On the LED boards 42 and 43, the light on/off operations of the LED chips 31 to 34, 37, and 38 can be controlled at independent timings for every light emitting color of R, G, and B.

Figure 23:
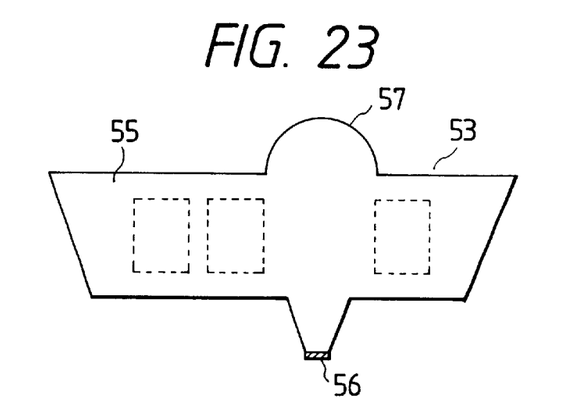
FIG. 23 is a diagram showing a positional relation between the LED packages and the optical guide light source in the conventional system.

FIG. 23 shows a cross sectional view of the optical guide light source 53 and a positional relation between the light source 53 and the LED packages 71 to 74, 77, and 78 on the LED boards 42 and 43. Rectangles shown by broken lines indicate positions of the LED packages 71 to 74, 77, and 78 on the LED boards 42 and 43 shown in FIGS. 20 and 21.

The apparatus is designed in a manner such that the lights emitted from the LED chips 31 to 34, 37, and 38 on the LED boards 42 and 43 don't directly enter a reflecting portion 56 provided in the lower portion of the optical guide light source 53 and an optical guide portion 55 is set to an angle such that the LED lights are totally reflected at both edges in the transversal direction of the optical guide portion 55. Therefore, the internal reflection is repeated many times in the optical guide light source 53 and the light is transmitted in the longitudinal direction of the optical guide portion 55 with a very small loss of light amount. After completion of a few times of internal reflection, when the light enters the reflecting portion 56, the light is diffused and reflected in the original direction and is further converged by a light converging portion 57, thereby irradiating only a region near the reading surface of the original. In this instance, the light beam entering the reflecting portion 56 is an indirect light reflected in the optical guide light source 53. An opening is adjusted in the longitudinal direction so that the irradiation light to the original becomes uniform. Therefore, a uniformity of the illuminance on the original surface is good.

When a color original is read by the image sensor with such a construction, first, data to correct a shading which is caused by a variation in sensitivity of the line sensor or a variation in irradiation light of the light source is fetched. When the data for correcting the shading is fetched, the LEDs 31 and 32 of R, the LEDs 33 and 34 of G, and the LEDs 37 and 38 of B are respectively sequentially driven so as to emit the light every kind and every color, a white reference provided in the original reading apparatus is read, and output signals of the image sensor in this instance are respectively temporarily stored into the memory. A correction is performed in a manner such that when the white reference is again read by signals for correcting the shading of R, G, and B obtained as mentioned above, the signals of R, G, and B are uniform on one line, and there is a relation of (r=g=b) among a sensor output signal r when the LEDs 31 and 32 of R emit the lights, a sensor output signal g when the LEDs 33 and 34 of G emit the lights, and a sensor output signal b when the LEDs 35 and 36 of B emit the lights.

When the original is actually read, in case of the color image sensor of the light source switching type, as mentioned above, in order to obtain the three signals of R, G, and B at one point on the original to be read, it is necessary to individually irradiate the lights of R, G, and B to the original. As a method for this purpose, the original can be read by what is called an area-sequential method such that the operation to sub-scan the image sensor for the whole original in a light-on state of the LED of one of the three colors of R, G, and B is repeated three times while changing the kind of LED to be lit on. Or, the original can be read by what is called a line-sequential method such that the image sensor is sub-scanned for the whole original while sequentially lighting on the LEDs of the three colors of R, G, and B every line to be read, thereby obtaining R, G, and B signals. By using any one of the above methods, the R, G, and B signals of the whole original surface are obtained and a color image can be reproduced by using those RGB signals.

When the optical guide light source in which the LED boards are attached to both edges is used as a light source of the color image sensor of the light source switching type, the whole original surface can be uniformly irradiated by a small number of LED chips, so that a cheap color image sensor can be realized.

Figure 24:
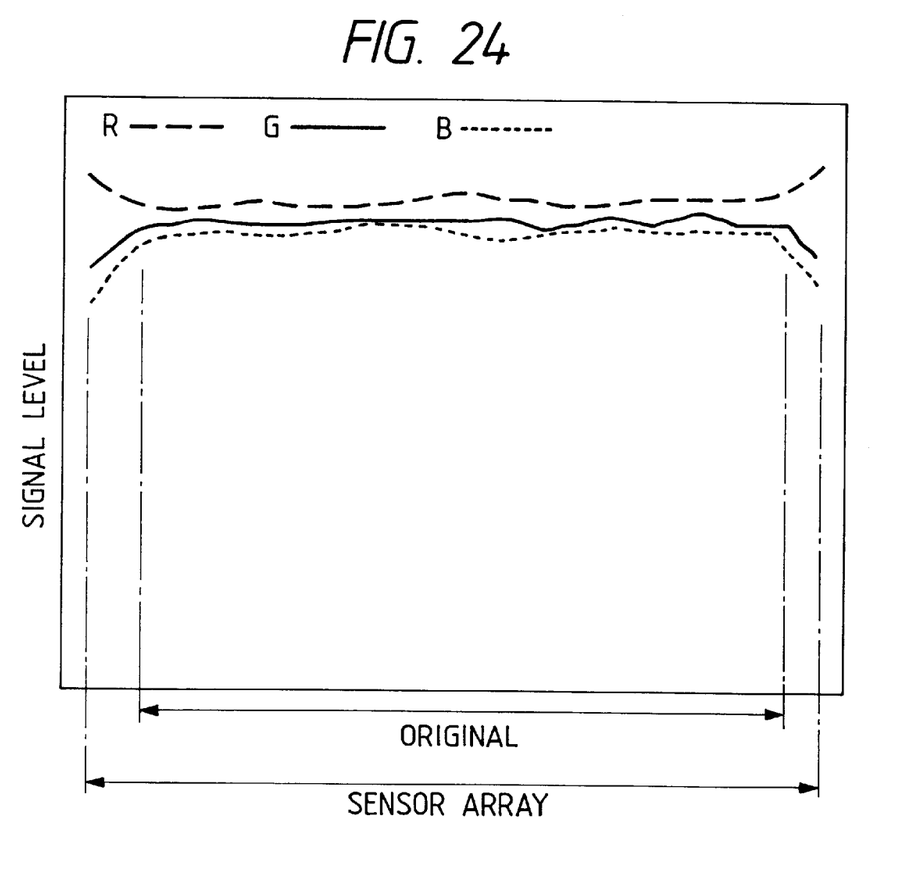
FIG. 24 is a diagram showing sensor output signals when a white reference is read in the conventional system.

However, according to such a conventional color image sensor as mentioned above, since the position of only R among the positions of the three kinds of LED packages of R, G, and B on the LED boards attached to both edges of the optical guide light source for the reflecting portions of the optical guide light source differs from those of G and B, even if an irradiation light distribution is adjusted by the shape of the aperture of the optical guide light source, it is difficult to obtain the uniform irradiation lights for all of the three colors of R, G, and B over the whole original surface. FIG. 24 shows output signals of the sensor array when the LEDs of R, G, and B are lit on and the white reference is irradiated in the light source switching type color image sensor as mentioned above. It will be understood that a uniformity in the original surface and a correlation of the irradiation lights of R, G, and B deteriorate in portions, particularly, near both edges of the optical guide light source. This is because the position of the LED light source for the reflecting portion of the optical guide light source exerts an influence on the irradiation light to the original at positions, particularly, near both edges of the optical guide light source.

Therefore, according to the conventional light source switching type color image sensor, the size in the longitudinal direction of the image sensor is set to be larger than the size of original to be actually read and the image sensor in which both edge portions of the optical guide light source are excluded has to be used for reading. Such a structure becomes a cause of obstructing a miniaturization of the color image sensor.

SUMMARY OF THE INVENTION

It is an object of the invention to provide an image reading system which can read an image at a high speed and a high picture quality.

Another object of the invention to provide an image reading apparatus which can read an image at a high speed and a high picture quality.

Still another object of the invention is to provide an illumination in which a uniform irradiation light without a variation can be obtained.

To accomplish the above object, according to an embodiment of the invention, there is provided an image reading apparatus comprising: a plurality of illuminating means; and optical guide means for guiding lights from the plurality of illuminating means and reflecting the lights in the direction of an object, thereby irradiating the object in a line shape, wherein three or more illuminating means are arranged at positions in the optical guide means which are symmetrical for a reflecting portion of the optical guide means.

With such a construction, the object can be irradiated by the light without any variation and an image of a high picture quality can be read.

According to another embodiment of the invention, there is provided an image reading apparatus comprising: a plurality of light sources; and optical guide means for guiding the lights irradiated by the plurality of light sources and irradiating an object in a line shape, wherein the plurality of light sources are packaged and arranged in a part of the optical guide means.

With such a construction, a uniform line-shaped irradiation light can be obtained while reducing the number of light sources to be used and the costs can be reduced.

According to further another embodiment of the invention, there is provided an image reading apparatus comprising: a plurality of illuminating means in each of which a plurality of light sources are packaged and whose sizes are different; and optical guide means for guiding lights irradiated by the plurality of illuminating means and reflecting the lights in the direction of an object, thereby irradiating the object in a line shape, wherein a small package among the plurality of packages is arranged at a position near a reflecting portion of the optical guide means and a large package is arranged at a position far from the reflecting portion.

With such a construction, the object can be uniformly irradiated by an enough light amount and an image reading operation of a high picture quality can be performed.

The above and other objects and features of the present invention will become apparent from the following detailed description and the appended claims with reference to the accompanying drawings.

DETAILED DESCRIPTION OF THE PREFERRED EMBODIMENTS

Figure 1:
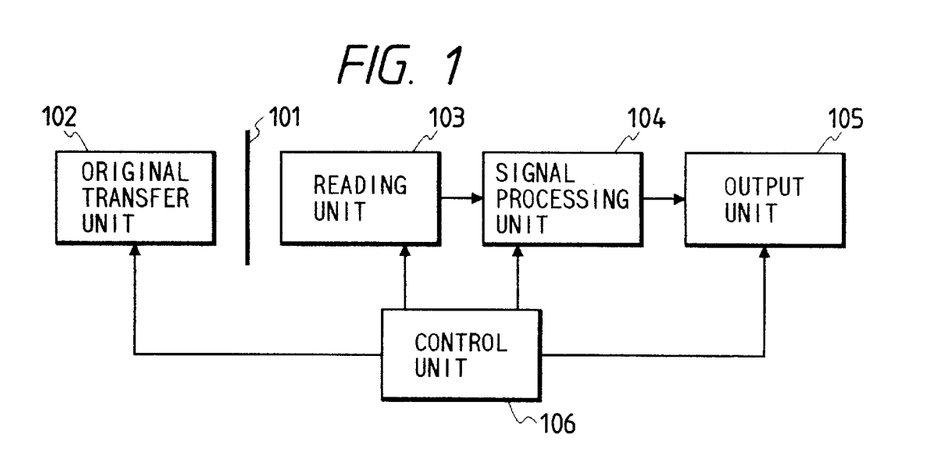
FIG. 1 is a constructional block diagram of an image reading system according to an embodiment.

The first embodiment of the invention will now be described hereinbelow with reference to the drawings. FIG. 1 is a constructional diagram of an image reading system embodying the invention. The system can be applied to an image scanner, a facsimile, a copying apparatus, or the like.

As shown in FIG. 1, the image reading system is constructed by an original transfer unit 102, a reading unit 103, a signal processing unit 104, an output unit 105, and a control unit 106 to control the whole system. An original 101 is fed by the original transfer unit 102 and an image on the original is read by the reading unit 103. The control unit 106 controls in a manner such that LEDs of R, G, and B in the reading unit 103 are sequentially lit on and lights of three colors of R, G, and B are sequentially irradiated to the original 101 from an oblique direction of about 45°. Image signals of the three colors of R, G, and B are generated from the reading unit 103 and inputted to the signal processing unit 104. The signal processing unit 104 executes an adjustment of signal levels and processes such as shading correction, gamma correction, color correction, and the like to the image signals. The image signals which were subjected to the various processes are outputted to the outside from the output unit 105.

Figure 2:
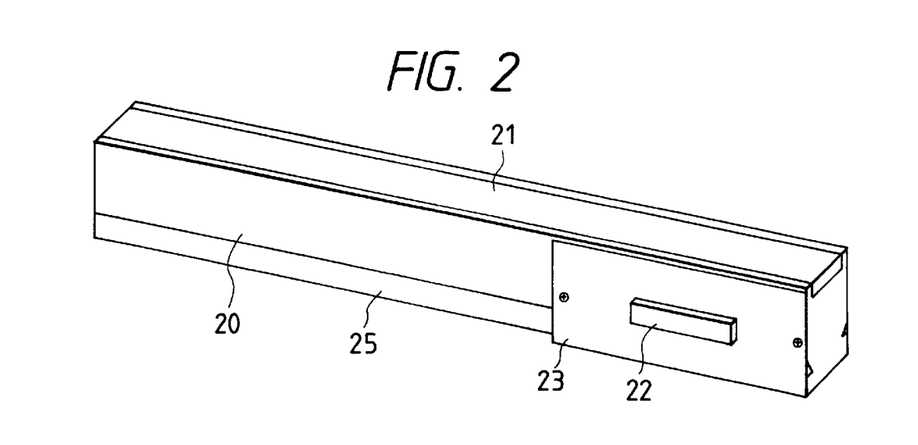
FIG. 2 is an external view of a reading unit in the image reading system in the embodiment.
Figure 3:
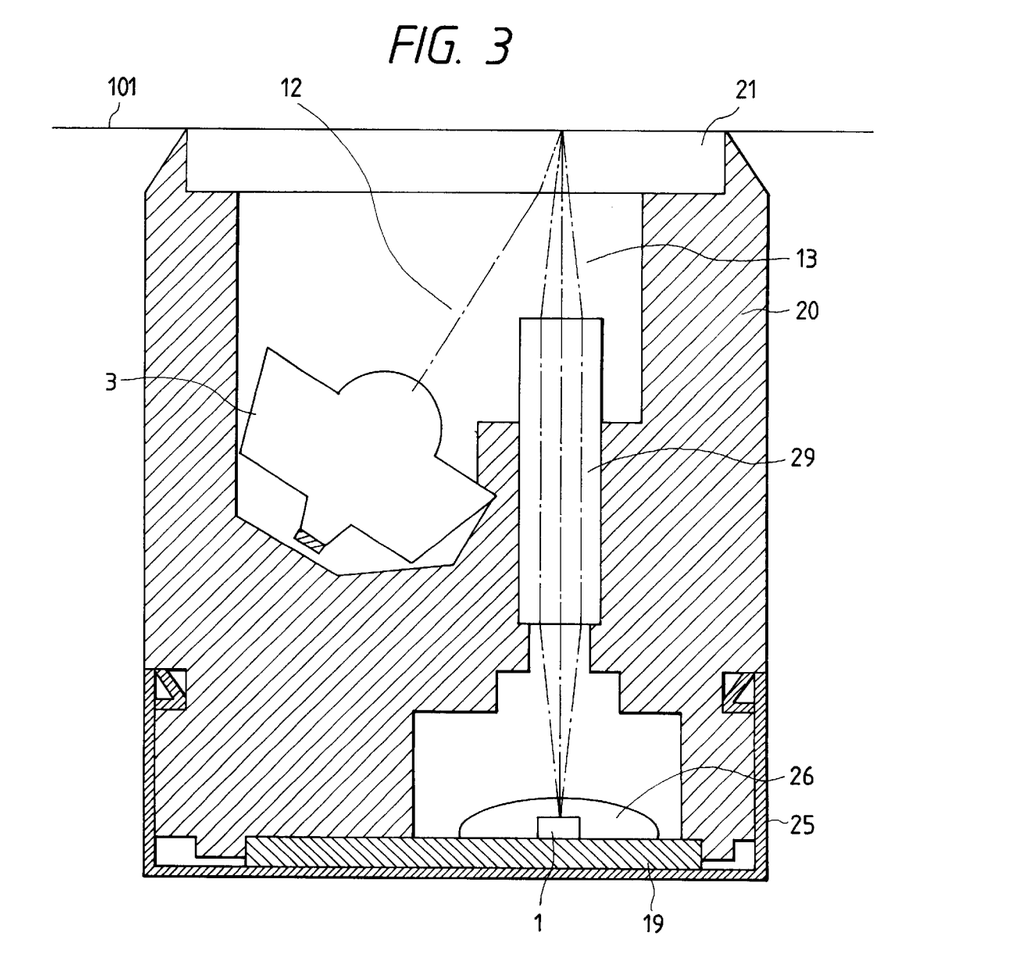
FIG. 3 is a cross sectional view of the reading unit in the image reading system in the embodiment.
Figure 15:
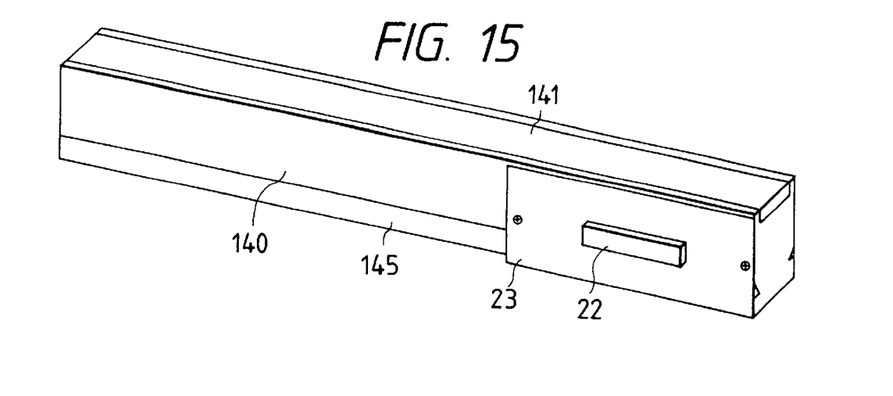
FIG. 15 is an external view of a reading unit in an image reading system in the embodiment.
Figure 16:
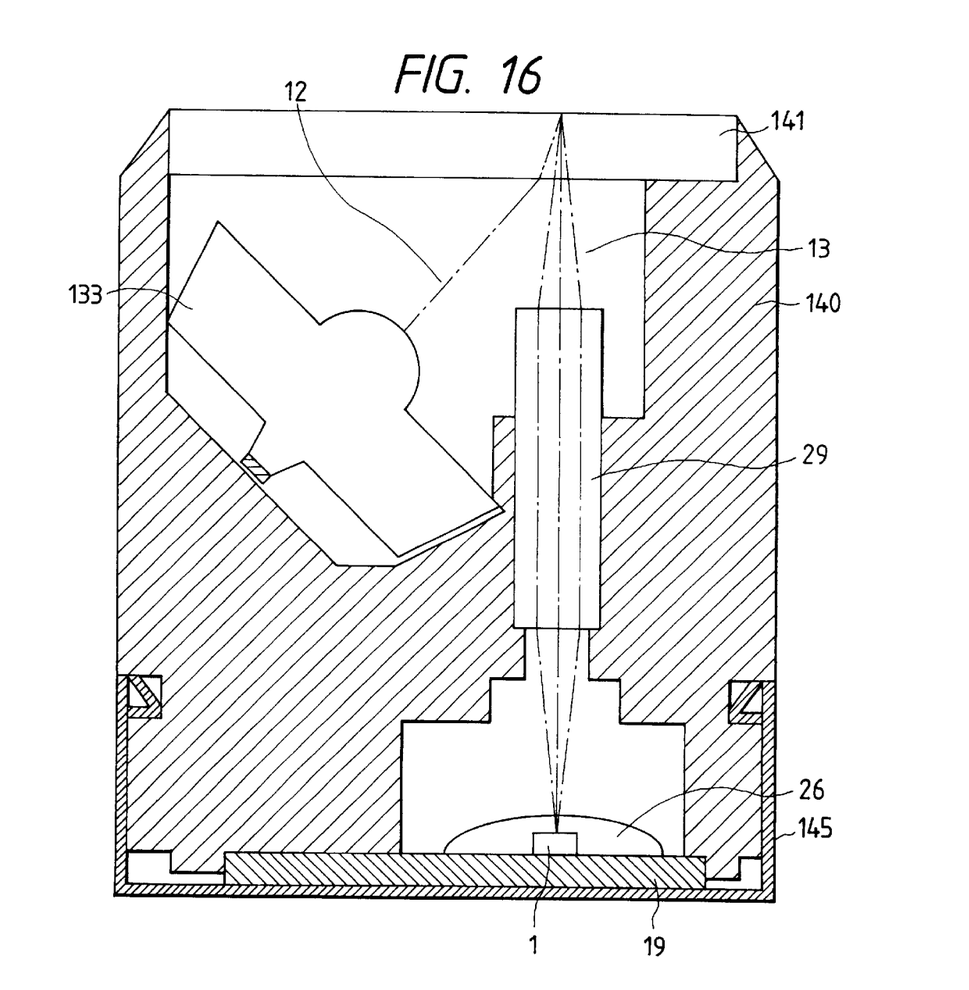
FIG. 16 is a cross sectional view of the reading unit in an image reading system in the embodiment.

The reading unit 103 will now be described. FIG. 2 is an external view of the reading unit 103. FIG. 3 is a cross sectional view. A detailed description of a fundamental construction is omitted here because it is substantially the same as that of FIGS. 15 and 16 shown in the Related Background Art. However, a whole system has a compact size in the transversal direction of the original irradiating surface of the image sensor, namely, in the lateral direction in FIG. 3. The light 12 irradiated from the optical guide light source 3 is reflected by the original 101, is formed as an image onto the line sensor 1 serving as photoelectric converting means by the lens array 29, and is converted into an image signal.

LED boards 40 and 41 serving as illuminating means which are attached to both edge portions in the longitudinal direction of an optical guide light source 3 will now be described.

Figure 4:
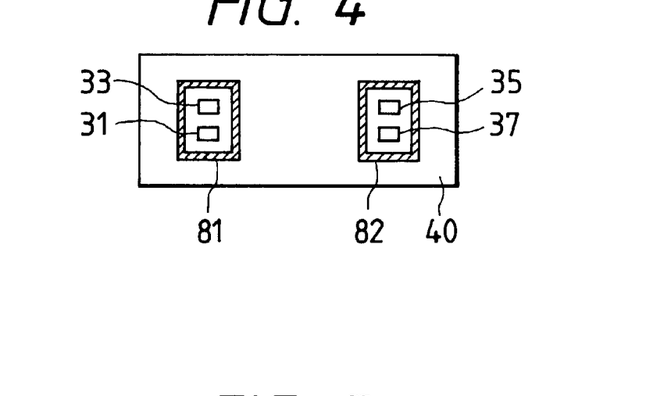
FIG. 4 is an arrangement diagram of LEDs of an LED package in the embodiment.
Figure 5:
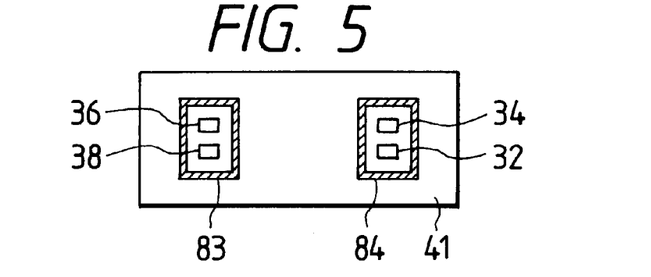
FIG. 5 is an arrangement diagram of LEDs of an LED package in the embodiment.

FIGS. 4 and 5 are diagrams showing an arrangement of LED packages 81 to 84 on the LED boards 40 and 41 which are attached to both edge portions in the longitudinal direction of an optical guide light source of a color image sensor of a light source switching type in the first embodiment embodying the invention and an arrangement of the LED chips 31 to 38 as light sources packaged in the LED packages.

The LED chips 31 and 32 having the light emitting color of R and the LED chips 33 and 34 having the light emitting color of G are enclosed in the LED packages 81 and 84, respectively. The LED chips 35 and 36 having the light emitting color of G and the LED chips 37 and 38 having the light emitting color of B are enclosed in the LED packages 82 and 83, respectively. On the LED boards 40 and 41, the light on/off operations of the LED chips 31 to 38 can be controlled by the control unit 106 at independent timings per light emitting color of R, G, and B, respectively.

Figure 6:
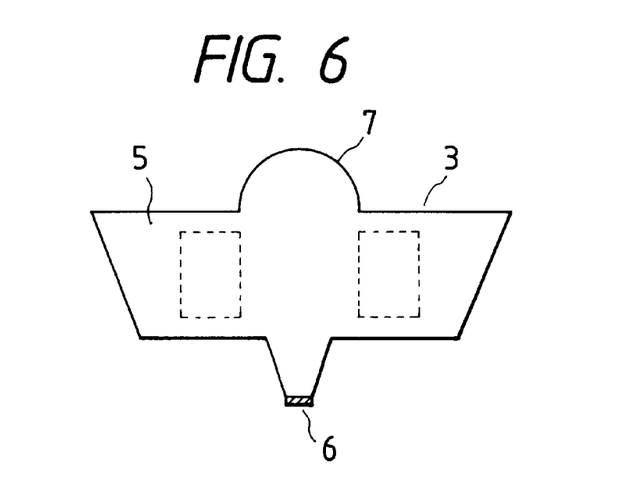
FIG. 6 is a diagram showing a positional relation between the LED packages and an optical guide light source in the embodiment.

A cross sectional view of the optical guide light source 3 in which the LED boards 40 and 41 are attached to both edge portions is as shown in FIG. 6. In the diagram, an optical guide portion 5 serving as optical guide means transmits the lights emitted from the LED chips 31 to 38 to the longitudinal direction of the optical guide light source 3, namely, the direction perpendicular to the paper surface. When the light transmitted by the optical guide portion 5 enters a reflecting portion 6, the reflecting portion 6 diffuses and reflects the light in the direction of an original as an object. A light converging portion 7 is used to converge the reflection light from the reflecting portion 6 in a line shape to a portion of the original to be read. Rectangles shown by broken lines in the diagram indicate positions of the LED packages 81 to 84 on the LED boards 40 and 41 shown in FIGS. 3 and 4. The LED packages are arranged at positions which are symmetrical for the reflecting portion 6.

Figure 7:
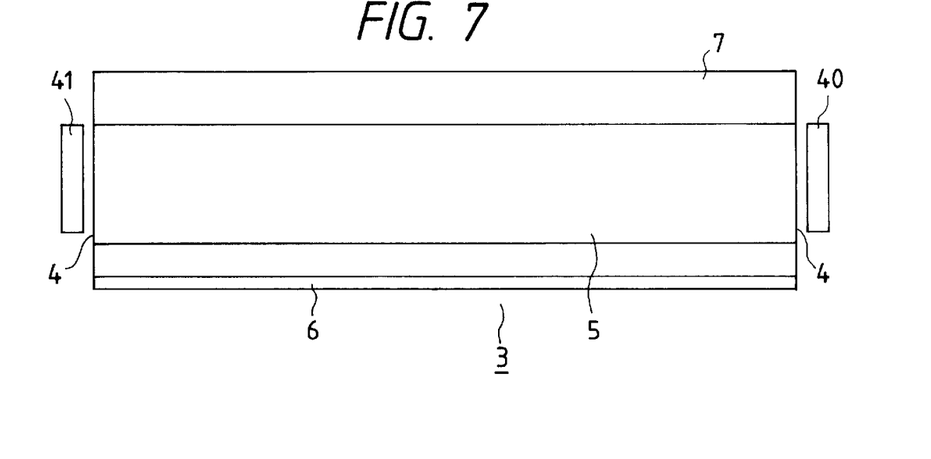
FIG. 7 is a diagram showing a positional relation between LED boards and the optical guide light source in the embodiment.

FIG. 7 shows a shape in the longitudinal direction of the optical guide light source 3. The LED boards 40 and 41 are attached to both edges of the optical guide light source 3. In the diagram, the lights from the LED chips 31 to 38 enter the optical guide light source 3 from an incident surface 4. In the diagram, the apparatus is designed in a manner such that the lights emitted from the LED chips 31 to 38 on the LED boards 40 and 41 don't directly enter the reflecting portion 6 provided in the lower portion of the optical guide light source 3. The optical guide portion 5 is set to an angle such that the LED lights are totally reflected at both edges in the transversal direction. Therefore, the internal reflection is repeated many times in the optical guide light source 3 and the light is transmitted in the longitudinal direction of the optical guide portion 5 with a very small loss of light amount.

After completion of the internal reflection of several times, when the light enters the reflecting portion 6, the light is diffused and reflected in the direction of the original surface. The light is further converged by the light converging portion 7 and irradiates only a region near the reading surface of the original in a line shape. In this instance, the light beam entering the reflecting portion 6 is an indirect light reflected in the optical guide light source 3. An aperture is adjusted in the longitudinal direction so as to make the reflection light to the original uniform, so that a uniformity of the illuminance on the original surface is very good.

In the embodiment, the number of LED chips of G included in the optical guide light source 3 is twice as large as that of the LED chips of each of the other colors. Therefore, when the white reference is read, it is necessary to set the signal levels of R, G, and B to a similar level. For this purpose, a current flowing in the LED chips of G is reduced to a value lower than the currents of the LED chips of R and B or an accumulation time for reading the original of one line is reduced.

Figure 8:
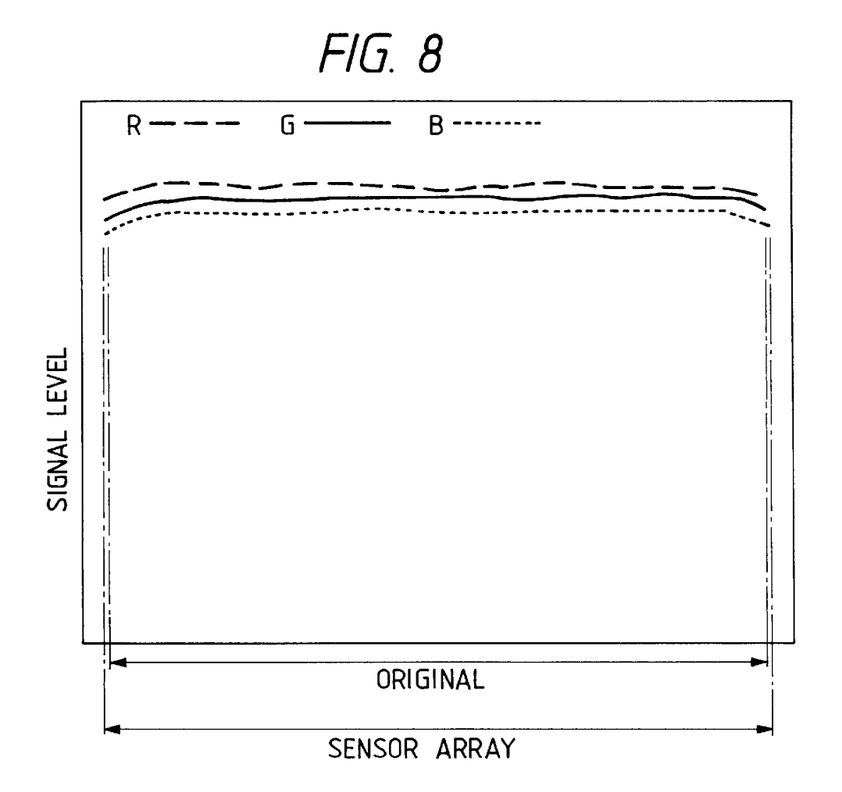
FIG. 8 is a diagram showing a sensor output signal when a white reference is read in the embodiment.

After the light-on conditions of the LED chips of each of R, G, and B were set, sensor outputs when the irradiation lights of R, G, and B are irradiated to the white reference are as shown in FIG. 8. As compared with the sensor outputs when the conventional optical guide light source 53 shown in FIG. 22 is used, particularly, a correlation among the shading waveforms of R, G, and B at positions near both edge portions is improved. Up to an original of a length that is almost equal to the length of sensor array can be read. This is because since the relative positions for the reflecting portion 6 are almost equal among the LED chips of R, G, and B, even for the light emissions of the LED chips of any one of R, G, and B, irradiation light distributions on the original surface are almost equal.

Figure 9:
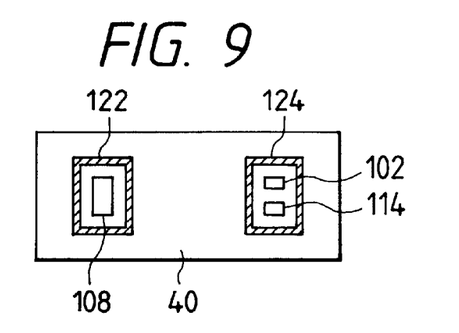
FIG. 9 is an arrangement diagram of LEDs of an LED package in the embodiment.
Figure 10:
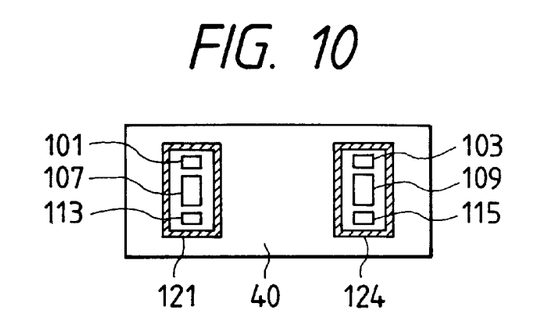
FIG. 10 is an arrangement diagram of LEDs of an LED package in the embodiment.

As mentioned above, two LED packages are arranged at symmetrical positions for the reflecting portion 6 of the optical guide light source 3 and the LED chips of two colors are enclosed in each of the two LED packages, so that the LED chips of three colors of R, G, and B can be enclosed in the two LED packages. With such a construction, the shading waveforms of R, G, and B have shapes which are very approximate and the original can be read even at positions near both edges of the optical guide light source 3, respectively. In the embodiment, although the two LED chips have been enclosed in each LED package, for example, as shown in FIG. 9, it is also possible to arrange an LED chip 108 of G which is larger than those of the other colors into one LED package 122 and to arrange LED chips 102 and 114 of R and B into another LED package 124. Further, as shown in FIG. 10, it is also possible to arrange LED chips 101 and 103 of R, LED chips 107 and 109 of G, and LED chips 113 and 115 of B into LED packages 121 and 124, respectively. In this case, there is no problem even when the arranging orders of the LED chips of R, G, and B on the right and left sides are different. However, it is more preferable that they coincide.

Since the optical guide light source 3 is miniaturized as mentioned above, the whole image sensor unit can be also miniaturized. Although the embodiment has been described with respect to the color image sensor of three colors of R, G, and B, it is also possible to use light sources of other colors such as cyan, magenta, and yellow. Packages as in the embodiment can be also obviously applied to a black and white image reading apparatus using a monochromatic light source from a viewpoint of a prevention of a variation of an illuminance. Light sources other than the LED can be also used as light sources. Further, the shape of optical guide member is not limited to that shown in the embodiment.

Figure 11:
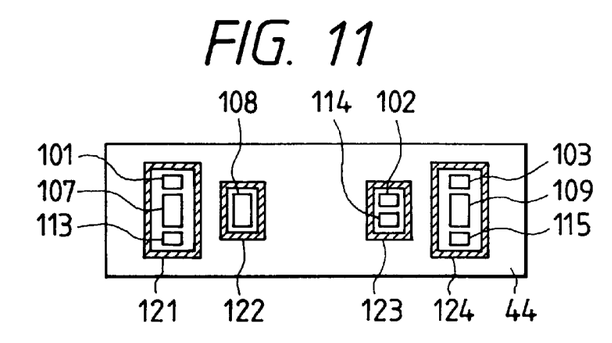
FIG. 11 is an arrangement diagram of LEDs of an LED package in the embodiment.
Figure 12:
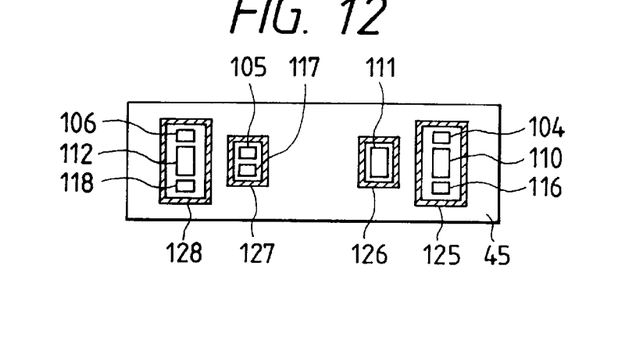
FIG. 12 is an arrangement diagram of LEDs of an LED package in the embodiment.

As a second embodiment of the invention, a form using LED chips of different sizes of R, G, and B and LED packages enclosing the LED chips will now be described. FIGS. 11 and 12 show an arrangement of LED packages 121 to 128 on LED boards 44 and 45 as component elements of a light source switching type color image sensor and an arrangement of LED chips 101 to 118 enclosed in those LED packages.

On the LED board 44 shown in FIG. 11, the small LED packages 122 and 123 are arranged at positions near the center and the large LED packages 121 and 124 are arranged at positions far from the center so as to be symmetrical with respect to the right and left directions, respectively. Similarly, on the LED board 45 shown in FIG. 12, small LED packages 126 and 127 are arranged at positions near the center and the large LED packages 125 and 128 are arranged at positions far from the center so as to be symmetrical with respect to the right and left directions, respectively. As for the LED chips which are arranged in each LED package, only the LED chip of G is larger than the LED chips of R and B.

Three LED chips comprising the LED chip 101 having the light emitting color of R, LED chip 107 having the light emitting color of G, and LED chip 113 having the light emitting color of B are arranged in the LED package 121 on the LED board 44. Similarly, three kinds of LED chips comprising the LED chip 103 having the light emitting color of R, LED chip 109 having the light emitting color of G, and LED chip 115 having the light emitting color of B are enclosed in the LED package 124.

Three kinds of LED chips comprising the LED chip 104 having the light emitting color of R, LED chip 110 having the light emitting color of G, and LED chip 116 having the light emitting color of B are enclosed in the LED package 125 on the LED board 45. Similarly, three kinds of LED chips comprising the LED chip 106 having the light emitting color of R, LED chip 112 having the light emitting color of G, and LED chip 118 having the light emitting color of B are enclosed in the LED package 128.

The LED chip 108 having the light emitting color of G is enclosed in the small LED package 122 arranged on the left side near the center on the LED board 44, and the LED chip 102 having the light emitting color of R and the LED chip 114 having the light emitting color of B are enclosed in the small LED package 123 arranged on the right side near the center.

Similarly, the LED chip 111 having the light emitting color of G is enclosed in the small LED package 126 arranged on the right side near the center on the LED board 45, and the LED chip 105 having the light emitting color of R and the LED chip 117 having the light emitting color of B are enclosed in the small LED package 127 arranged on the left side near the center. On the LED boards 44 and 45, the light on/off operations of the LED chips 101 to 118 can be controlled by the control unit 106 at independent timings per light emitting color of each of R, G, and B, respectively.

Figure 13:
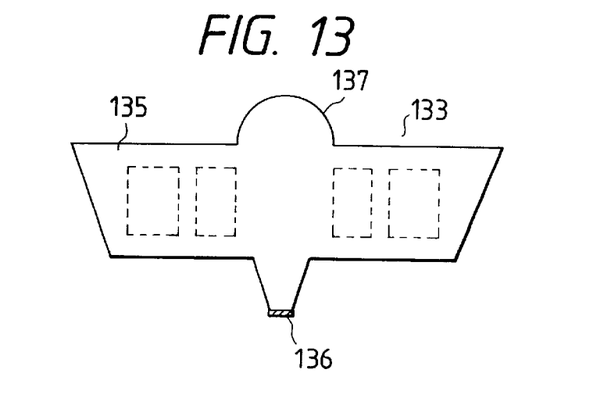
FIG. 13 is a diagram showing a positional relation between LED packages and an optical guide light source in the embodiment.

An optical guide light source 133 in which the LED boards 44 and 45 as mentioned above are attached to both edge portions has a cross sectional view as shown in FIG. 13. In the diagram, an optical guide portion 135 transmits the lights emitted from the LED chips 101 to 118 to the longitudinal direction of the optical guide light source 133. The light transmitted by the optical guide portion 135 enters a reflecting portion 136, by which the light is diffused and reflected in the direction of the original. A light converging portion 137 converges the reflection light from the reflecting portion 136 to a portion of the original to be read. In the diagram, rectangles shown by broken lines indicate positions of the LED packages 121 to 128 on the LED boards 44 and 45 shown in FIGS. 11 and 12. The small LED packages are arranged at positions near the reflecting portion 136 and the large LED packages are arranged at positions far from the reflecting portion 136.

Figure 14:
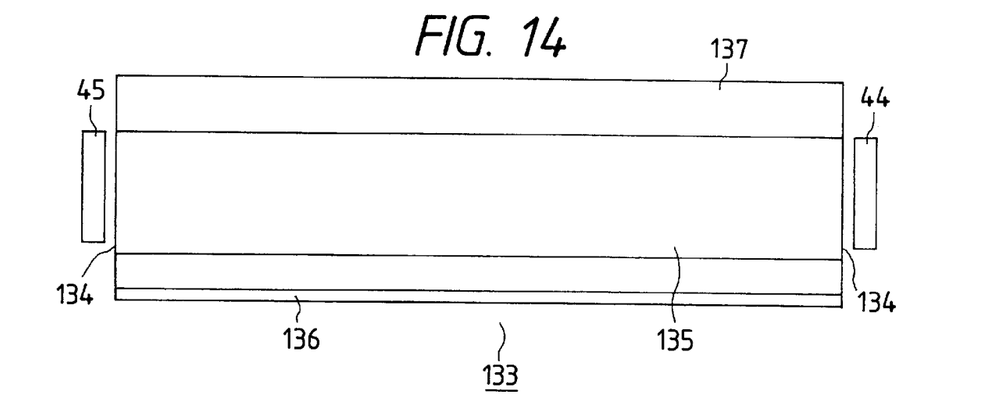
FIG. 14 is a diagram showing a positional relation between LED boards and the optical guide light source in the embodiment.

FIG. 14 shows a shape in the longitudinal direction of an image sensor of the optical guide light source 133. The LED boards 44 and 45 are attached to both edges of the optical guide light source 133. The lights emitted from the LED chips 101 to 118 enter the optical guide light source 133 from an incident surface 134.

The apparatus is designed in a manner such that the lights emitted from the LED chips 101 to 118 on the LED boards 44 and 45 don't directly enter the reflecting portion 136 provided in the lower portion of the optical guide light source 133. An optical guide portion is set to an angle such that the lights emitted from the LED chips are totally reflected at both edges in the transversal direction of the optical guide portion 135. Therefore, the internal reflection is repeated many times in the optical guide light source 133 and the light is transmitted in the longitudinal direction of the optical guide portion 135 with a very small loss of light quantity.

After completion of the internal reflection of several times, when the light enters the reflecting portion 136, the light is diffused and reflected in the direction of the original surface. Further, the light is converged by the light converging portion 137 and irradiates only a region near the reading surface of the original in a line shape. In this instance, the light beam entering the reflecting portion 136 is an indirect light reflected in the optical guide light source 133 and an aperture is adjusted in the longitudinal direction so that the irradiation lights to the original become uniform, so that a uniformity of the illuminance on the original surface is good.

FIG. 15 shows an external view of a light source switching type color image sensor according to the embodiment and FIG. 16 shows a cross sectional view thereof. As compared with the image sensor shown in FIG. 3 in the first embodiment, a width in the longitudinal direction of a cross sectional view of an optical guide member is wider. However, it is sufficient to use such a construction in case of needing to read at a high speed by an enough light emission light quantity.

Generally, among the LED chips of R, G, and B, there are many cases where sizes of LED chips are different due to a difference of a manufacturing process or a mass production for the purpose of reduction in costs. There is a case where a plurality of LED chips of different sizes have to be combined and used as in the embodiment. In such a case, although the LED chips of R, G, and B can be also enclosed in a large LED package, when the position of the LED package is too close to the reflecting portion of the optical guide light source, a difference among the positions of the LED chips of R, G, and B in the LED package deteriorates a correlation among the irradiation lights of R, G, and B on the original surface. Therefore, the LED chips have to be arranged at positions far from the center of the LED package on the LED board.

Therefore, as shown in FIGS. 11 and 12, the large LED packages 121, 124, 125, and 128 in which all of the three LED chips of R, G, and B are enclosed are arranged at positions away from the reflecting portion 136, thereby maintaining the correlation among the irradiation lights of R, G, and B on the original surface. On the other hand, since only the small LED packages 122, 123, 126, and 127 can be arranged at positions near the reflecting portion 136 because of the above reason, all of the LED chips of R, G, and B cannot be enclosed in the same LED package. Therefore, the relatively large LED chips 108 and 111 of G are solely enclosed in the small LED packages 122 and 126 and the relatively small LED chips 102 and 105 and relatively small LED chips 114 and 117 of B are enclosed in other small LED packages 123 and 127 arranged at positions which are symmetrical for the reflecting portion 136, respectively.

Although the two small LED packages 122, 123, 126, and 127 are arranged at positions near the reflecting portion 136, since three LED chips of R, G, and B are not vertically arranged as in the large LED packages 121, 124, 125, and 128, the relative positions of the LED chips of R, G, and B in each LED package for the reflecting portion 136 are almost equal. Therefore, a correlation among the irradiation lights of R, G, and B by the LED chips of R, G, and B is also good.

In the embodiment as mentioned above, even if the optical guide light source 133 is not so enlarged, the LED chips of the number that is three times as large as that of the conventional color image sensor are installed with respect to each of R, G, and B on the LED boards 44 and 45, so that an amount of light to be irradiated onto the original surface with respect to each of R, G, and B is also about three times as large as the conventional one. Therefore, when the white reference is read, in order to obtain the signal level of the sensor output that is almost equal to that in the conventional case, it is sufficient that an accumulation time to read the original of one line is set to about ⅓ of the conventional one and the original image can be read at a speed that is about three times as high as the conventional one. Moreover, in a manner similar to the first embodiment, the correlation among the irradiation lights of R, G, and B is held for the reflecting portion 136 of the optical guide light source 133 and it is sufficient that a length of image sensor unit is almost equal to the size of original to be read.

As mentioned above, every two LED packages of two kinds of small and large sizes are arranged on the LED boards at the positions which are symmetrical to the reflecting portion of the optical guide light source in a manner such that the small LED packages are arranged at positions near the center and the large LED packages are arranged on the outside. One or two kinds of LED chips are enclosed in the small LED package in accordance with the size of LED chip and three kinds of LED chips of R, G, and B are arranged in the large LED package. Therefore, the LED chips of any one of R, G, and B are arranged at the symmetrical positions for the reflecting portion of the optical guide light source. While keeping the correlation among the original surface illuminance distributions of the R, G, and B lights, many LED chips can be put on the LED boards without enlarging so far the optical guide light source and the illuminance on the original surface is raised, so that the original image can be read at a high speed in a short line reading time.

In addition, the present invention also can be applied to an image sensor in which a light source is arranged at one end of the optical guide light source and thereby the same technological effect as the embodiment described above can be also attained, while the above-described embodiment is directed to an image sensor in which the light sources are arranged at both ends of the optical guide light source.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a plurality of groups of illuminators, constructed from a plurality of packages, each of which having a plurality of light emitting elements enclosed as one package;
   an optical guide, arranged to guide the light from said plurality of groups of illuminators and reflect it in a direction of an object, thereby irradiating said object in a line shape; and a photoelectric convertor, arranged to photoelectrically convert the light reflected from said object to output an image signal, wherein said plurality of groups of illuminators are arranged at positions which are symmetrical with respect to a reflecting portion of the optical guide when viewed along a longitudinal direction of said optical guide.

2. An apparatus according to claim 1, wherein the light emitting elements are arranged in each said package so as to be adjacent in the irradiating direction of said object.

3. An apparatus according to claim 1, wherein said plurality of groups of illuminators is constructed by a plurality of packages of different sizes.

4. An apparatus according to claim 1, wherein a small package is arranged at a position near said reflecting portion and a large package is arranged at a position far from said reflecting portion.

5. An apparatus according to claim 1, wherein said plurality of groups of illuminators is provided in edge portions of said optical guide.

6. An apparatus according to claim 1, wherein said plurality of groups of illuminators is provided in both edge portions of said optical guide.

7. An apparatus according to claim 1, wherein said optical guide means is made of a light transmitting resin.

8. An apparatus according to claim 1, wherein said plurality of groups of illuminators can be respectively independently lit.

9. An apparatus according to claim 8, wherein said plurality of groups of illuminators can be sequentially lit.

10. An apparatus according to claim 1, wherein at least one of said plurality of light emitting elements has spectral characteristics different from those of the other light emitting elements.

11. An apparatus according to claim 10, wherein said light emitting elements include light emitting elements having spectral characteristics of red, green, and blue.

12. An apparatus according to claim 10, wherein said light emitting elements include light emitting elements having spectral characteristics of cyan, magenta, and yellow.

13. An apparatus according to claim 1, wherein said light emitting elements include LEDs.

14. An apparatus according to claim 1, further having a line-shaped photoelectric converter, arranged to convert the light from the object illuminated by the optical guide into an image signal.

15. An apparatus according to claim 14, further having a controller, arranged to control said illuminator and said photoelectric converter.

16. An image reading apparatus comprising:

a plurality of illuminators of different sizes in each of which a plurality of light sources are packaged; and an optical guide, arranged to guide light emitted from said plurality of illuminators and to reflect it in a direction of an object, thereby illuminating said object in a line shape, wherein a small package among said plurality of packages is arranged at a position near a reflecting portion of said optical guide and a large package is arranged at a position far from said reflecting portion.

17. An apparatus according to claim 16, wherein said light sources are provided at the edge portions of said optical guide.

18. An apparatus according to claim 17, wherein said plurality of light sources is provided at both edge portions of said optical guide.

19. An apparatus according to claim 16, wherein said optical guide means is made of a light transmitting resin.

20. An apparatus according to claim 16, wherein each respective individual light source of said plurality of light sources can be respectively independently lit.

21. An apparatus according to claim 20, wherein said plurality of light sources can be sequentially lit.

22. An apparatus according to claim 16, wherein at least one of said plurality of light sources is constructed from a light source having different spectral characteristics.

23. An apparatus according to claim 22, wherein said plurality of light sources includes light sources having spectral characteristics of red, green, and blue.

24. An apparatus according to claim 22, wherein said plurality of light sources includes light sources having spectral characteristics of cyan, magenta, and yellow.

25. An apparatus according to claim 16, wherein said plurality of light sources includes LEDs.

26. An apparatus according to claim 16, further having a line-shaped photoelectric converter, arranged to convert the light from the object irradiated by said optical guide into an image signal.

27. An apparatus according to claim 26, further having a controller, arranged to control said light sources and said photoelectric converter.

28. An illuminating apparatus comprising:

a plurality of groups of illuminators, constructed from a plurality of packages, each of which having a plurality of light emitting elements enclosed as one package; and an optical guide arranged to guide lights from said plurality of groups of illuminators and to reflect the guided lights in a direction of an object so as to illuminate said object in a line shape, wherein said plurality of groups of illuminators are arranged at a position which is symmetrical with respect to a reflection portion of said optical guide when viewed along a longitudinal direction of said optical guide.

29. An apparatus according to claim 28, wherein said light emitting elements are arranged in each said package so as to be adjacent in the direction of illumination of said object.

30. An apparatus according to claim 28, wherein said plurality of groups of illuminators is constructed by a plurality of packages of different sizes.

31. An apparatus according to claim 28, wherein a small package is arranged at a position near said reflecting portion and a large package is arranged at a position far from said reflecting portion.

32. An apparatus according to claim 28, wherein said plurality of groups of illuminators is provided at edge portions of said optical guide.

33. An apparatus according to claim 28, wherein said plurality of groups of illuminators is provided at both edge portions of said optical guide.

34. An apparatus according to claim 28, wherein said optical guide is made of a light transmitting resin.

35. An apparatus according to claim 28, wherein said plurality of groups of illuminators can be respectively independently lit.

36. An apparatus according to claim 35, wherein said plurality of groups of illuminators can be sequentially lit.

37. An apparatus according to claim 28, wherein at least one of said light emitting elements has spectral characteristics different from those of the other light emitting elements.

38. An apparatus according to claim 37, wherein said light emitting elements include light emitting elements having spectral characteristics of red, green, and blue.

39. An apparatus according to claim 37, wherein said light emitting elements include light emitting elements having spectral characteristics of cyan, magenta, and yellow.

40. An apparatus according to claim 28, wherein said light emitting elements include LEDs.

41. An image reading system comprising:
a plurality of groups of illuminators, constructed from a plurality of packages, each of which having a plurality of light emitting elements enclosed as one package;
an optical guide arranged to guide light from said plurality of groups of illuminators and to reflect the guided light towards an object to illuminate the object in a line shape,
a photoelectric converter, arranged to photoelectrically convert light from the object into an image signal; and
a positional shifter, arranged to shift the relative position of the object with respect to said photoelectric converter,
wherein said plurality of groups of illuminators are arranged at a symmetrical position with respect to the reflection portion of the optical guide when viewed along a longitudinal direction of said optical guide.

42. A system according to claim 41, wherein said light emitting elements are arranged in each said package so as to be adjacent in the direction of illumination of said object.

43. A system according to claim 41, wherein said plurality of groups of illuminators is constructed from a plurality of packages of different sizes.

44. A system according to claim 41, wherein a small package is arranged at a position near said reflecting portion of said optical guide and a large package is arranged at a position far from said reflecting portion.

45. A system according to claim 41, wherein said plurality of groups of illuminators is provided at edge portions of said optical guide.

46. A system according to claim 41, wherein said plurality of groups of is provided at both edge portions of the optical guide.

47. A system according to claim 41, wherein the optical guide is made of a light transmitting resin.

48. A system according to claim 41, wherein the plurality of groups of illuminators can be respectively independently lit.

49. A system according to claim 48, wherein said plurality of groups of illuminators can be sequentially lit.

50. A system according to claim 41, wherein at least one of said light emitting elements has spectral characteristics different from those of the other light emitting elements.

51. A system according to claim 50, wherein said light emitting elements include light emitting elements having spectral characteristics of red, green, and blue.

52. A system according to claim 50, wherein said light emitting elements include light emitting elements having spectral characteristics of cyan, magenta, and yellow.

53. A system according to claim 41, wherein said light emitting elements include LEDs.

54. A system according to claim 41, wherein said positional shifter moves the object.

55. A system according to claim 41, further comprising a signal processor, arranged to perform predetermined processing on the image signal.

56. A system according to claim 55, further comprising a controller, arranged to control the driving of the illuminators and the photoelectric converter as well as for controlling the signal processor.

57. A system according to claim 41, further comprising a controller, arranged to control the driving of the illuminators and the photoelectric converter.

58. An image reading system comprising:
a plurality of groups of illuminators, constructed from a plurality of packages, each of which having a plurality of light emitting elements enclosed as one package;
an optical guide arranged to guide light from said plurality of groups of illuminators and to reflect the guided light towards an object to illuminate the object in a line shape,
a photoelectric converter, arranged to photoelectrically convert light from the object into an image signal; and
a signal processor, arranged to perform predetermined processing on the image signal,
wherein said plurality of groups of illuminators are arranged at a symmetrical position with respect to the reflection portion of the optical guide when viewed along a longitudinal direction of said optical guide.

59. A system according to claim 58, wherein said plurality of groups of illuminators are constructed from a plurality of packages, each of which having a plurality of light emitting elements enclosed as one package.

60. A system according to claim 59, wherein said light emitting elements are arranged in each said package so as to be adjacent in the irradiating direction of said object.

61. A system according to claim 59, wherein said plurality of groups of illuminators is constructed from a plurality of packages of different sizes.

62. A system according to claim 59, wherein a small package is arranged at a position near said reflecting portion and a large package is arranged at a position far from said reflecting portion.

63. A system according to claim 58, wherein said plurality of groups of illuminators is provided in the edge portions of said optical guide.

64. A system according to claim 58, wherein said plurality of groups of illuminators is provided in both edge portions of the optical guide.

65. A system according to claim 58, wherein said optical guide is made of a light transmitting resin.

66. A system according to claim 58, wherein said plurality of groups of illuminators can be respectively independently lit.

67. A system according to claim 66, wherein said plurality of groups of illuminators can be sequentially lit.

68. A system according to claim 58, wherein at least one of said light emitting elements has spectral characteristics different from those of the other light emitting elements.

69. A system according to claim 68, wherein said light emitting elements include light emitting elements having spectral characteristics of red, green, and blue.

70. A system according to claim 68, wherein said light emitting elements include light emitting elements having spectral characteristics of cyan, magenta, and yellow.

71. A system according to claim 58, wherein said light emitting elements include LEDs.

72. An image reading system comprising:
a plurality of groups of illuminators, constructed from a plurality of packages, each of which having a plurality of light emitting elements enclosed as one package;
an optical guide arranged to guide light from the plurality of groups of illuminators and to reflect the guided light towards an object to illuminate the object in a line shape, a photoelectric converter, arranged to photoelectrically convert light from the object into an image signal; and a controller, arranged to control the driving of the illuminators and the photoelectric converter, wherein said plurality of groups of illuminators are arranged at a symmetrical position with respect to the reflection portion of the optical guide when viewed along a longitudinal direction of the optical guide.

73. A system according to claim 72, wherein said light emitting elements are arranged in each said package so as to be adjacent in the direction of illumination of said object.

74. A system according to claim 72, wherein said plurality of groups of illuminators is constructed by a plurality of packages of different sizes.

75. A system according to claim 72, wherein a small package is arranged at a position near said reflecting portion and a large package is arranged at a position far from said reflecting portion.

76. A system according to claim 72, wherein said plurality of groups of illuminators is provided in the edge portions of said optical guide.

77. A system according to claim 72, wherein said plurality of groups of illuminators is provided in both edge portions of said optical guide.

78. A system according to claim 72, wherein said optical guide is made of a light transmitting resin.

79. A system according to claim 72, wherein said plurality of groups of illuminators can be respectively independently lit.

80. A system according to claim 79, wherein said plurality of groups of illuminators can be sequentially lit.

81. A system according to claim 72, wherein at least one of said light emitting elements has spectral characteristics different from those of the other light emitting elements.

82. A system according to claim 81, wherein said light emitting elements include light emitting elements having spectral characteristics of red, green, and blue.

83. A system according to claim 81, wherein said light emitting elements include light emitting elements having spectral characteristics of cyan, magenta, and yellow.

84. A system according to claim 72, wherein said light emitting elements include LEDs.

* * * * *